(12) United States Patent
Ravichandran

(10) Patent No.: US 12,194,802 B1
(45) Date of Patent: Jan. 14, 2025

(54) SIMPLIFIED HOLD AND DRIVE FEATURE FOR A BALL JOINT

(71) Applicant: Ford Global Technologies, LLC, Dearborn, MI (US)

(72) Inventor: Akhilesh Ravichandran, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/487,475

(22) Filed: Oct. 16, 2023

(51) Int. Cl.
*B60G 21/055* (2006.01)
*B60G 7/00* (2006.01)

(52) U.S. Cl.
CPC ......... *B60G 21/0551* (2013.01); *B60G 7/005* (2013.01); *B60G 2204/416* (2013.01); *B60G 2204/422* (2013.01)

(58) Field of Classification Search
CPC ............... B60G 21/0551; B60G 7/005; B60G 2204/416; B60G 2204/422
See application file for complete search history.

(56) References Cited

U.S. PATENT DOCUMENTS

| | | | |
|---|---|---|---|
| 3,254,902 A | 6/1966 | Vittone | |
| 5,794,965 A | 8/1998 | Stuker et al. | |
| 5,954,353 A * | 9/1999 | Kincaid | F16C 7/02 280/124.152 |
| 6,076,840 A * | 6/2000 | Kincaid | B60G 21/0551 267/188 |
| 6,308,972 B1 | 10/2001 | Kincad et al. | |
| 6,604,270 B2 * | 8/2003 | Kincaid | F16C 11/0638 280/124.152 |
| 7,261,017 B2 | 8/2007 | Jensen et al. | |
| 10,589,391 B2 | 3/2020 | Macarthur et al. | |
| 11,041,524 B2 * | 6/2021 | Kuroda | B60G 21/0551 |
| 2011/0103883 A1 * | 5/2011 | Seol | F16C 11/068 403/135 |
| 2016/0238063 A1 * | 8/2016 | Yokoi | F16C 11/0614 |
| 2017/0313154 A1 * | 11/2017 | Kuroda | B60G 7/005 |
| 2018/0272481 A1 * | 9/2018 | MacArthur | B23P 19/066 |
| 2018/0298940 A1 * | 10/2018 | Kuroda | F16C 11/0633 |

FOREIGN PATENT DOCUMENTS

| | | |
|---|---|---|
| EP | 1065077 A1 | 1/2001 |
| EP | 1170158 B1 | 10/2004 |

* cited by examiner

*Primary Examiner* — Toan C To
(74) *Attorney, Agent, or Firm* — Burr & Forman LLP; Lorne Forsythe

(57) ABSTRACT

A suspension assembly for a vehicle may be provided. The suspension assembly may include a strut which may operably couple a wheel of the vehicle to a body of the vehicle, a stabilizer bar, and a stabilizer bar link which may operably couple the stabilizer bar to the strut. The stabilizer bar link may include a first ball joint, a second ball joint, and a shaft which may extend therebetween. The first and second ball joints may include first and second threaded shafts, respectively, that may extend through respective first and second receiving orifices. A base of the first and second threaded shafts may include a non-rounded shaped perimeter. A perimeter of one of the first and second receiving orifices may be complementary to the non-rounded shaped perimeter to hold one of the first and second threaded shafts in place while the fastener may be tightened thereon.

20 Claims, 10 Drawing Sheets

SIMPLIFIED HOLD AND DRIVE FEATURE FOR A BALL JOINT

TECHNICAL FIELD

Example embodiments generally relate to suspension components and, more particularly, relate to a structure for securing the ball joints to a vehicle with a simpler installation procedure.

BACKGROUND

Many modern vehicles may utilize a MacPherson strut suspension design, or a variation thereof, due to the MacPherson strut's relative lack of complexity and ease of manufacture. The MacPherson strut construction may include various suspension components which may include, but not limited to, a strut, a stabilizer bar (i.e. a sway bar or anti roll bar), and a stabilizer bar link. The stabilizer bar link may include ball joints that may operably couple the stabilizer bar link to the strut and to the stabilizer bar, respectively. In this regard, the stabilizer bar may operably couple to the respective struts disposed on each side of the vehicle via respective stabilizer bar links.

The ball joints of the stabilizer bar links may typically include a threaded shaft that may extend through a receiving structure on both the strut and stabilizer bar, such that a fastener that may be threaded onto the threaded shaft and tightened thereon to operably couple the stabilizer bar link to the strut and to the stabilizer bar accordingly. The fastener may typically be driven onto the threaded shaft using a hold and drive tool which may essentially hold the threaded shaft still while tightening the fastener around it to speed up the assembly process. However, this requires the use either of a specialized tool and a specialized threaded shaft, or multiple tools, in order to tighten the fastener onto the threaded shaft. Thus, there may be a need to simplify the ball joints for securing the stabilizer bar link to the suspension assembly to increase the efficiency of, and simplify, the hold and drive installation process without compromising the strength of the ball joint.

BRIEF SUMMARY OF SOME EXAMPLES

In accordance with an example embodiment, a suspension assembly for a vehicle suspension system of an example embodiment may therefore be provided. The suspension assembly may include a strut which may operably couple a wheel of the vehicle to a body of the vehicle, a stabilizer bar which may be operably coupled to the strut to reduce body roll, and a stabilizer bar link which may operably couple the stabilizer bar to the strut. The stabilizer bar link may include a first ball joint which may operably couple the stabilizer bar link to the strut, a second ball joint which may operably couple the stabilizer bar link to the stabilizer bar, and a shaft which may extend from the first ball joint to the second ball joint. The strut may include a stabilizer bar link bracket and a first receiving orifice may be formed in the stabilizer bar link bracket to operably couple to the first ball joint. A second receiving orifice may be formed at an end of the stabilizer bar to operably couple to the second ball joint. The first and second ball joints may include first and second threaded shafts, respectively, that may extend through respective ones of the first and second receiving orifices and operably couple to a fastener on an opposite side of the respective ones of the first and second receiving orifices. A base of one of the first and second threaded shafts may include a non-rounded shaped perimeter. A perimeter of one of the first and second receiving orifices may be complementary to the non-rounded shaped perimeter of the base of one of the first and second threaded shafts to hold one of the first and second threaded shafts in place while the fastener may be tightened thereon.

In another example embodiment, an upper ball joint assembly for a suspension system for a vehicle may be provided. The upper ball joint assembly may include a receiving orifice operably coupled to a strut, a ball joint which may include a threaded shaft to extend through the receiving orifice, and a fastener to operably couple the threaded shaft to the receiving orifice. A base of the threaded shaft may include a non-rounded shaped perimeter. A perimeter of the receiving orifice may be complementary to the non-rounded shaped perimeter of the base of the threaded shaft to hold the threaded shaft in place while the fastener may be tightened thereon.

In another example embodiment, a lower ball joint assembly for a suspension system for a vehicle may be provided. The lower ball joint assembly may include a receiving orifice operably coupled to a stabilizer bar, a ball joint which may include a threaded shaft to extend through the receiving orifice, and a fastener to operably couple the threaded shaft to the receiving orifice. The lower ball joint assembly may operably couple a stabilizer bar link to the stabilizer bar at a flattened end of the stabilizer bar. A base of the threaded shaft may include a non-rounded shaped perimeter. A perimeter of the receiving orifice may be complementary to the non-rounded shaped perimeter of the base of the threaded shaft to hold the threaded shaft in place while the fastener may be tightened thereon.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
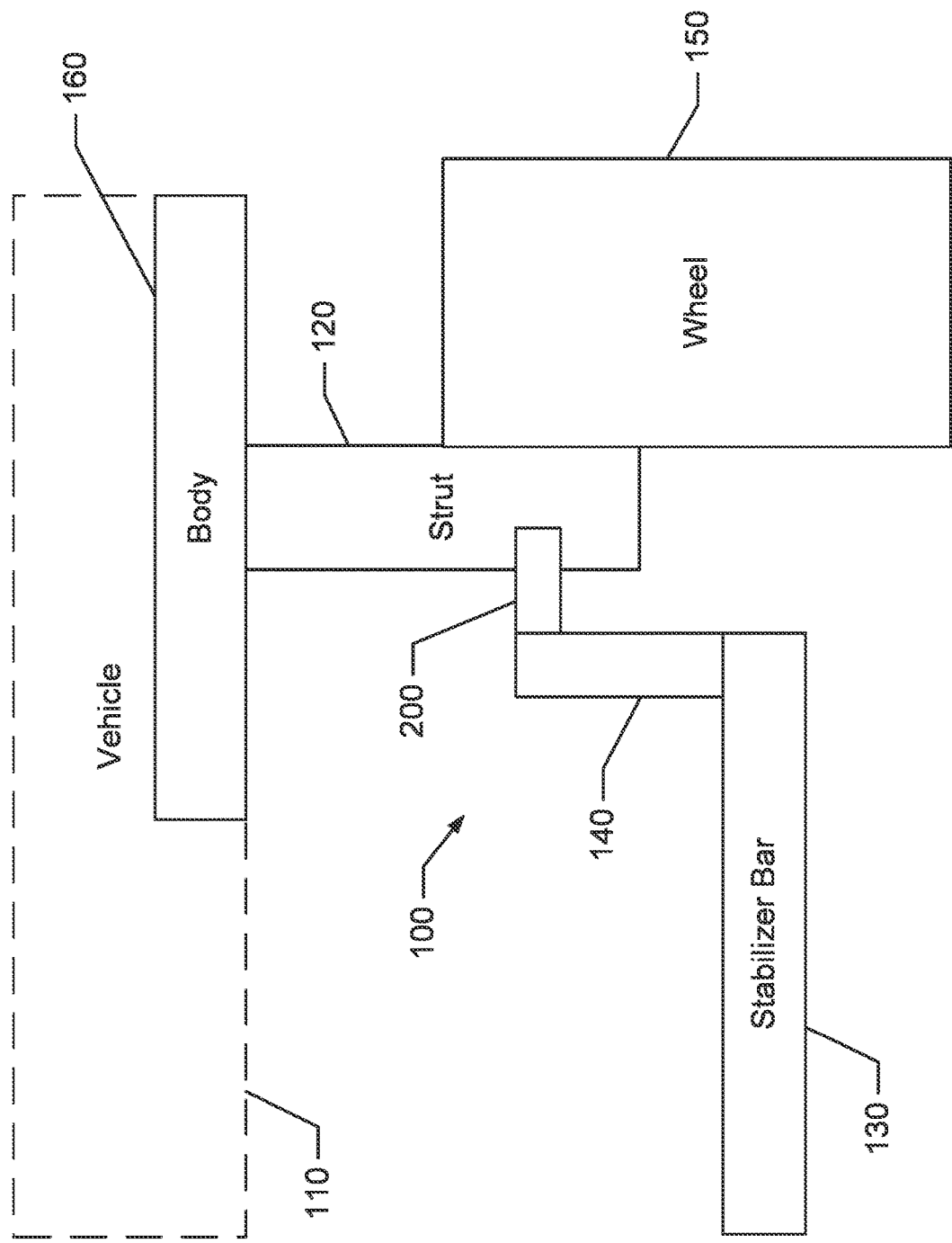
FIG. 1 illustrates a block diagram of a suspension assembly for a vehicle suspension system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may address the problems described above. In this regard, for example, some embodiments may provide a ball joint assembly for a suspension system of a vehicle that may make the ball joints, and the suspension system as a whole, simpler to install. Some embodiments may provide for the ball joint assemblies to be installed without requiring the use of a specialized hold and drive tool to tighten the fastener. As a result, installation of the ball joint assemblies may require less effort, less specialized tooling, less time and thus may be more efficient.

Figure 2:
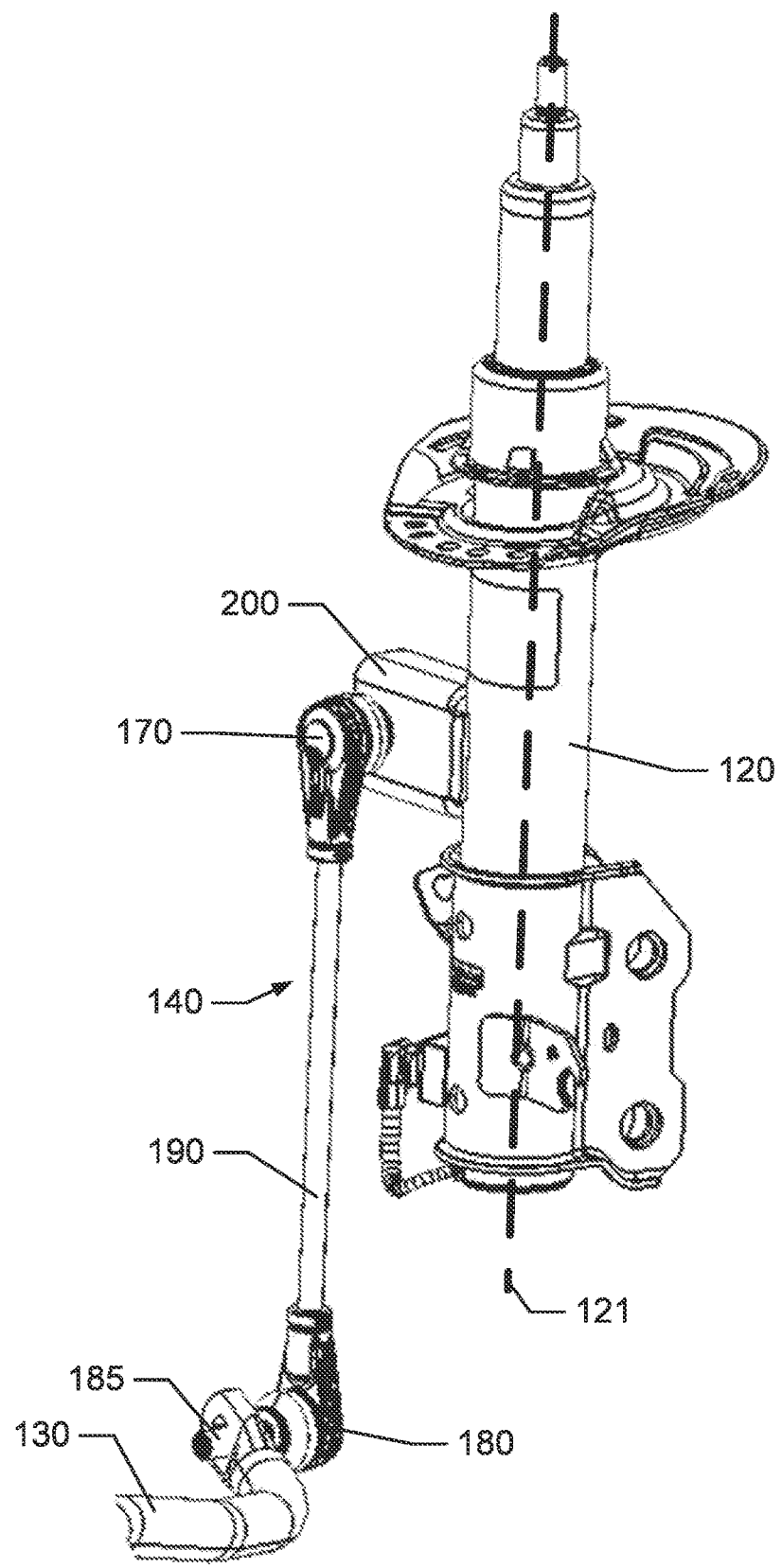
FIG. 2 depicts a perspective view of the suspension assembly in accordance with an example embodiment.
Figure 3:
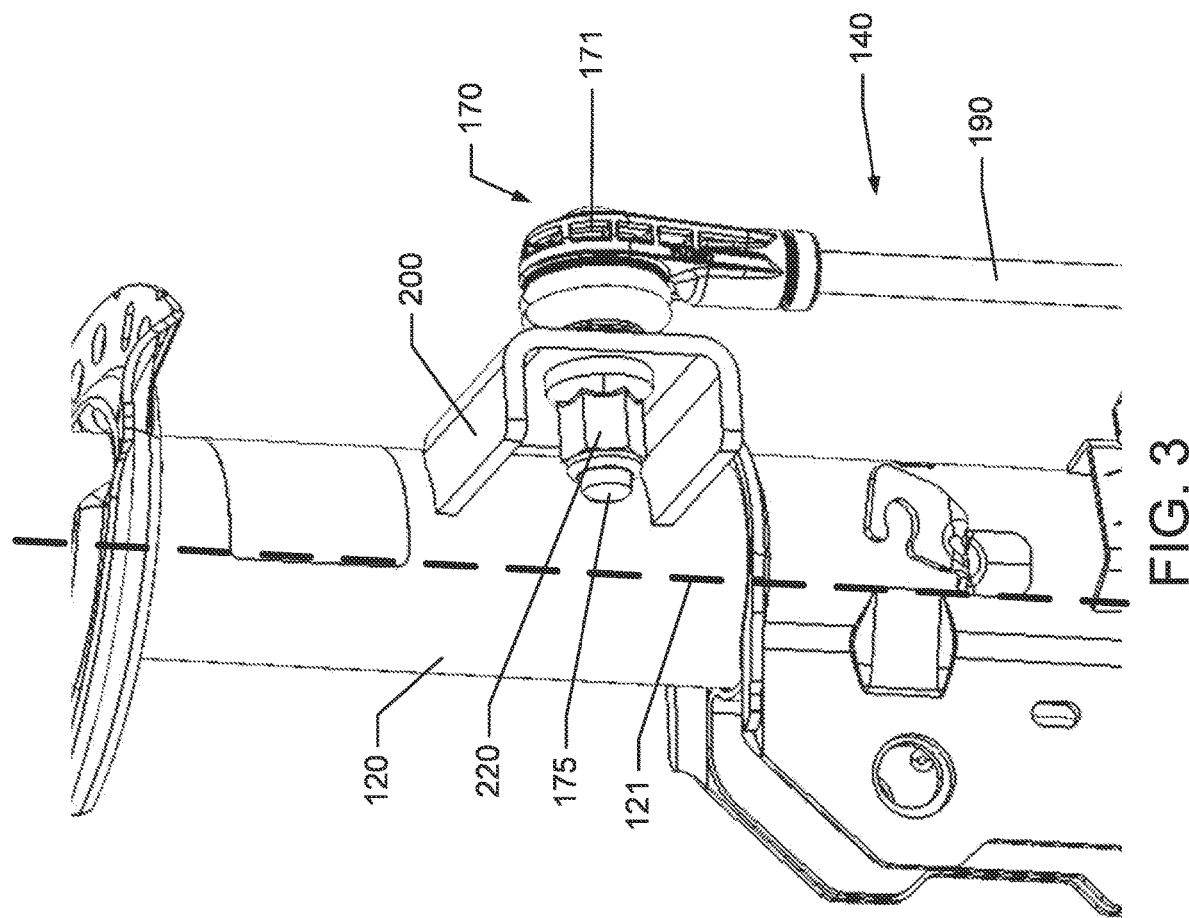
FIG. 3 depicts a closer-up perspective view of the suspension assembly highlighting the upper ball joint in accordance with an example embodiment.
Figure 4:
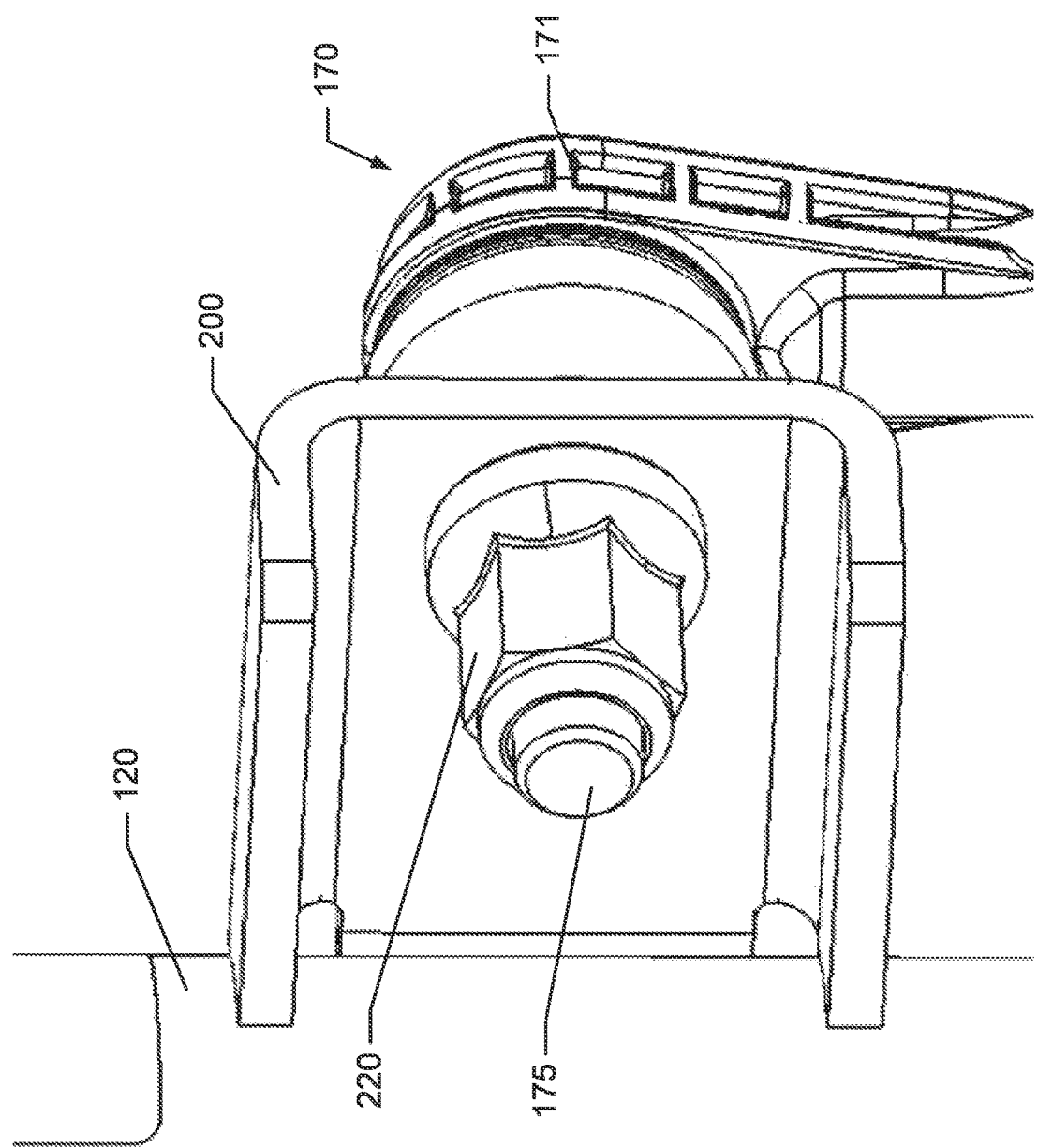
FIG. 4 illustrates a close up perspective view of the upper ball joint and the stabilizer bar link bracket in accordance with an example embodiment.
Figure 5:
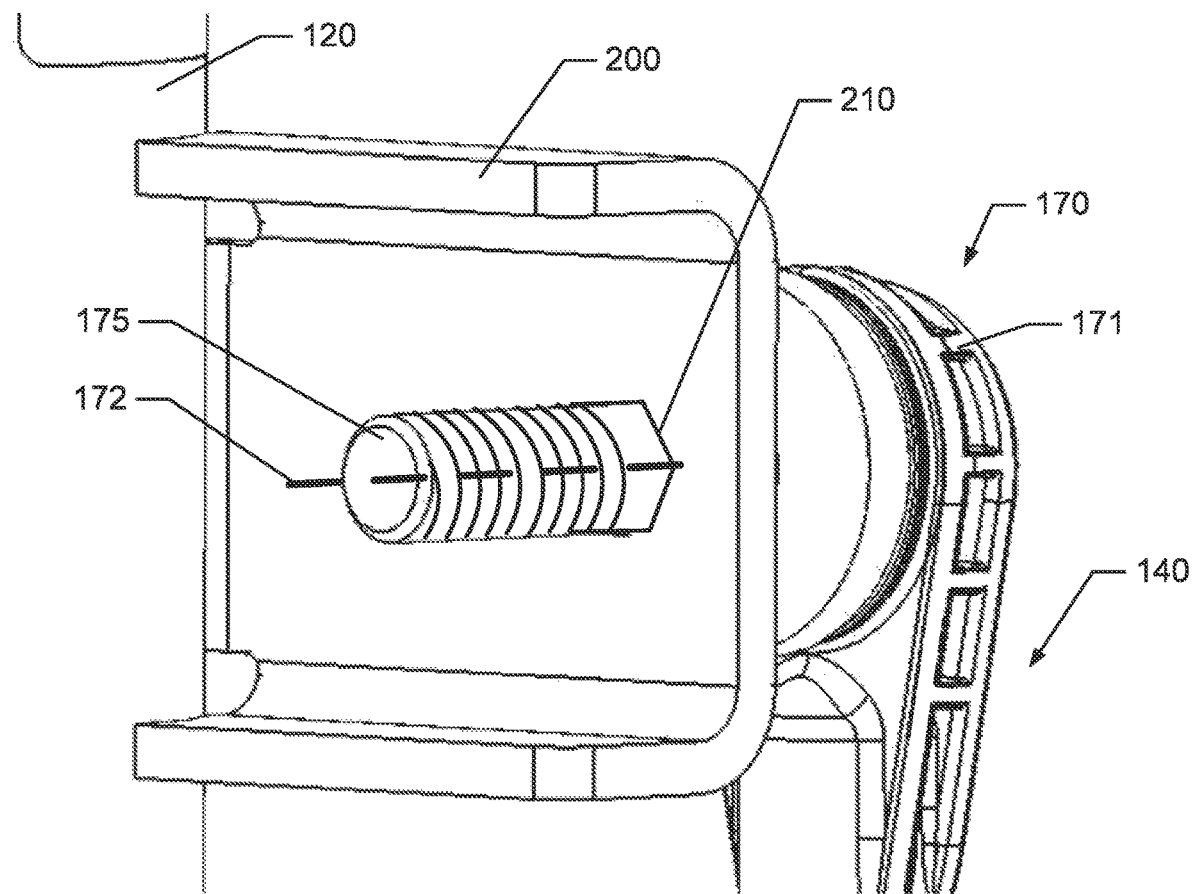
FIG. 5 illustrates a close up perspective view of the upper ball joint and the stabilizer bar link bracket with the fastener removed in accordance with an example embodiment.

FIG. 1 illustrates a block diagram of the suspension assembly 100 of a vehicle 110 according to an example embodiment, and FIG. 2 illustrates a perspective view of the suspension assembly 100 of a vehicle 110 in accordance with an example embodiment. As seen in FIGS. 1 and 2, in some embodiments the suspension assembly 100 may include a strut 120, a stabilizer bar 130, and a stabilizer bar link 140. The strut 120 may operably couple to a wheel 150 of the vehicle 110 and to a body 160 (or chassis) of the vehicle 110. In this regard, one of ordinary skill in the art may appreciate that the strut 120 may operably couple to the wheel 150 through a plurality of intermediate components, such as a steering knuckle and a wheel hub, both of which have not been shown in the figures or described in detail herein for the sake of simplicity. Additionally, in an example embodiment, the vehicle 110 may include unibody construction, in which case the body 160 may also act as the frame or chassis of the vehicle 110. In such cases, the strut 120 may be operably coupled to the body 160. However, in some other example embodiments, the vehicle 110 may include a body 160 that may be made separate from the frame or chassis and may be operably coupled to the frame or chassis (e.g. body-on-frame construction). In this regard, the strut 120 may be operably coupled to the frame or chassis rather than to the body 160. In any case, the body 160 may not be limited to only that exterior shell portion of the vehicle 110 that can be seen by the naked eye, and thus the body 160 may also include the frame or chassis in some cases. In some cases, the strut 120 may be a shock/spring combination that may permit the wheel 150 to articulate up and down along a direction parallel to a longitudinal axis 121 of the strut 120. In this regard, the strut 120 may dampen the articulation of the wheel 150 so that the movement of the wheel 150 may not get translated directly into movement of the vehicle 110. In doing so, the strut 120 may increase the quality of the ride as perceived by passengers within the vehicle 110 by absorbing some of the force from bumps due to the articulation of the wheel 150. Additionally, in an example embodiment, the suspension assembly 100 may be a form of a MacPherson strut construction. In this regard, the strut 120 may also play a role in the steering of the vehicle 110, and it may be operably coupled to a control arm and the steering knuckle which may act as a steering pivot for the wheel 150. Regardless, in some cases, the strut 120 may be substantially cylindrical in shape and may include a spring (not shown) disposed around a damper through which the longitudinal axis 121 may extend.

The stabilizer bar 130 may be operably coupled to the strut 120 at a first end 131 of the stabilizer bar 130 and also to another strut 120 which may be disposed at the opposite side of the vehicle 110 at a second end 132 of the stabilizer bar 130. The main function of the stabilizer bar 130 may be to reduce body 160 roll of the vehicle 110, especially through turns. In this regard, during a turn (and also during bumps), the body 160 of the vehicle 110 may tend to tilt laterally as the center of mass of the vehicle 110 may shift towards a side of the vehicle 110 on the outer edge of the turn. As this happens, the suspension assembly 100 at the outer side of the vehicle 110 may compress through the turn. Thus, the stabilizer bar 130 may be operably coupled to the strut 120 on both sides of the vehicle 110 so that as the vehicle 110 turns, the struts 120 on both sides of the vehicle 110 may compress together to keep the vehicle 110 more level through the turn. In other words, by preventing the outermost strut 120 from compressing more than the innermost strut 120 during a turn, the stabilizer bar 130 may keep the vehicle 110 more level through the turn. As such, the stabilizer bar 130 may also be referred to as an anti-roll bar, sway bar, roll bar, anti-sway bar, or another similar type of naming preference. As shown in FIGS. 1 and 2, the stabilizer bar 130 may extend substantially horizontally and substantially below the strut 120. In some cases, the stabilizer bar 130 may be substantially tube shaped for a majority of its length. As will be discussed below in reference to later figures, the first end 131 and the second end 132, where the stabilizer bar 130 may operably couple to the strut 120, may be pressed into a flattened end 134 to more easily operably couple to the stabilizer bar link 140 accordingly.

As seen in FIGS. 1 and 2, the stabilizer bar link 140 may operably couple the stabilizer bar 130 to the strut 120. The stabilizer bar link 140 of some embodiments may include a first ball joint 170 which may operably couple the stabilizer bar link 140 to the strut 120, a second ball joint 180 which may operably couple the stabilizer bar link 140 to the stabilizer bar 130, and a shaft 190 extending from the first ball joint 170 to the second ball joint 180. In some cases, the first ball joint 170 may be an upper ball joint and the second ball joint 180 may be a lower ball joint, which may be disposed below the first ball joint 170. Therefore, within the context of the stabilizer bar 130 described above, the stabilizer bar link 140 may transfer force to the stabilizer bar 130 during a turn via the first and second ball joints (170, 180) and the shaft 190. As described above, the force being transferred may be due to the weight of the vehicle 110 exerted on the strut 120 disposed on the outer side of the vehicle 110. Thus, in order to distribute that force to the strut 120 disposed at the opposite side of the vehicle 110 (i.e. the inner side during the turn) to keep the vehicle 110 more level through the turn, the first and second ball joints (170, 180)

may need to be strong and durable connection points to withstand the repeated stress put on the components operably coupled thereto.

Referring now to FIGS. 3-9, the suspension assembly 100 may further include a stabilizer bar link bracket 200 operably coupled to the strut 120. The stabilizer bar link bracket 200 may be disposed on an exterior of the strut 120 and may extend substantially away from the strut 120. In some cases, the stabilizer bar link bracket 200 may be permanently operably coupled to an exterior surface of the strut 120. In other words, in some cases the stabilizer bar link bracket 200 may be formed into a housing of the strut 120, whereas in other cases, the stabilizer bar link bracket 200 may be added onto the strut 120 separately, perhaps being welded to the strut 120. In an example embodiment, the stabilizer bar link bracket 200 may extend substantially tangentially to the strut 120. In this regard, the stabilizer bar link bracket 200 may be offset from the longitudinal axis 121 of the strut 120 which may put the stabilizer bar link bracket 200 closer to the first ball joint 170 to allow the first ball joint 170 to operably couple to the stabilizer bar link bracket 200 without putting undue added stress on the stabilizer bar link 140 or the first and second ball joints (170, 180).

The stabilizer bar link bracket 200 may include a first receiving orifice 210 disposed therein. In this regard, the first ball joint 170 may operably couple to the stabilizer bar link bracket 200 via the first receiving orifice 210. The first ball joint 170 may thus include a first threaded shaft 175, and the second ball joint 180 may thus include a second threaded shaft 185. The first and second threaded shafts (175, 185) may extend substantially away from the stabilizer bar link 140 in a direction that in some cases may be approximately perpendicular to the direction of extension of the shaft 190. However, the first and second ball joints (170, 180) may be ball and socket type joints. As such, the first and second threaded shafts (175, 185) may include a ball disposed at a lateral end thereof opposite from the threaded end. The ball of the first and second threaded shafts (175, 185) may operably couple to a socket disposed in a respective housing (171, 181) of the first and second ball joints (170, 180). The operable coupling of the ball to the socket within the respective housings (171, 181) of the first and second ball joints (170, 180) may enable the first and second threaded shafts (175, 185) to be free to pivot and rotate relative to the respective housing (171, 181) of the first and second ball joints (170, 180). Thus, the first and second threaded shafts (175, 185) may not always be oriented approximately perpendicular to the direction of extension of the shaft 190. In any case, the first threaded shaft 175 may extend through the first receiving orifice 210 disposed in the stabilizer bar link bracket 200 to operably couple the stabilizer bar link 140 to the strut 120. A fastener 220 may be threaded onto the first threaded shaft 175 on an opposite side of the stabilizer bar link bracket 200, and thus the first receiving orifice 210, from the stabilizer bar link 140 to removably operably couple the first ball joint 170 to the stabilizer bar link bracket 200. In some cases, a nut, wing nut, acorn nut, etc. may all be examples of the fastener 220 according to various example embodiments.

Figure 11:
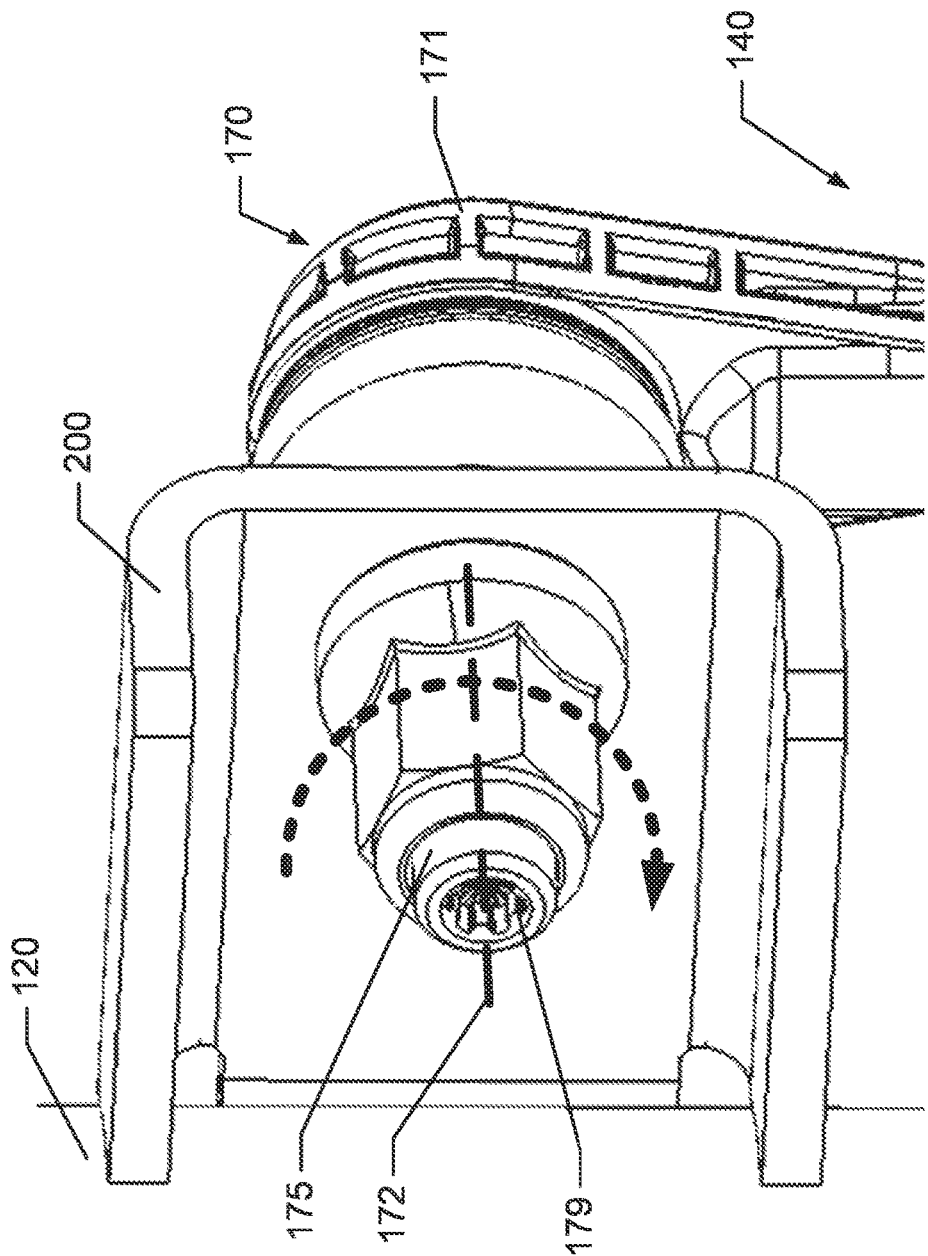
FIG. 11 illustrates a close up perspective view of the upper ball joint and the stabilizer bar link bracket.

As mentioned above, the first and second threaded shafts (175, 185) may be free to pivot and rotate relative to the first and second ball joints (170, 180), respectively. Thus, often times in existing designs that are currently in practice, when tightening the fastener 220 onto the first and second threaded shafts (175, 185), a user may have to use a specialized hold and drive tool that would hold a respective one of the first and second threaded shafts (175, 185) still while simultaneously driving the fastener 220 onto the threads of the respective one of the first and second threaded shafts (175, 185) so that the respective one of the first and second threaded shafts (175, 185) does not rotate in a same direction as the fastener 220, which may cause the fastener 220 to not tighten appropriately. In this regard, the first and second threaded shafts (175, 185) of currently existing designs may include a hold feature disposed at an axial end of the first and second threaded shafts (175, 185), respectively, that may operably couple to the specialized hold and drive tool. As such, the tool may hold the first and second threaded shafts (175, 185) still via their respective hold feature while simultaneously driving the fastener 220. FIG. 11 depicts an example of a prior art threaded shaft where the shaft may include the hold feature 179 disposed at an axial end thereof. As shown in FIG. 11, the hold feature 179 would typically be disposed along a first longitudinal axis 172 of the first threaded shaft 175, or along a second longitudinal axis 182 of the second threaded shaft 185, and often at an axial end thereof, distal to the stabilizer bar link bracket 200 and the stabilizer bar 130, respectively.

In some cases, the hold feature 179 would be an external hold feature. As such, the hold feature 179 would extend out away from the first threaded shaft 175 along the first longitudinal axis 172. The hold and drive tool would then include a bit that would receive the hold feature 179 therein to hold the first threaded shaft 175 still while driving the fastener 220 thereon simultaneously. In some other cases, such as the one shown in FIG. 11, the hold feature 179 would be an internal hold feature 179. In such cases, the hold and drive tool would include a bit that would extend into the internal hold feature 179 to hold the first threaded shaft 175 still while driving the fastener 220 thereon simultaneously. In either case, the hold feature 179 of the prior art designs may be a point of weakness in some embodiments of the first and second ball joints (170, 180). Additionally, the specialized tooling required to tighten the fastener 220 onto the first and second threaded shafts (175, 185) may prior art methods of installing the suspension assembly 100 less efficient in addition to having the potential to replace the hold feature on the first and second threaded shafts (175, 185) or on the hold and drive tool. In another example embodiment, the user installing the suspension assembly 100 may instead elect to utilize two separate wrenches to install the first and second ball joints (170, 180). In this regard, a first wrench may be used to hold a respective one of the first and second threaded shafts (175, 185) still while a second wrench may be used to drive the fastener 220 onto the respective one of the first and second threaded shafts (175, 185). This alternative method may not require the use of a specialized tool, but may still be labor and time intensive, which may also make it less efficient.

In order to increase the efficiency of the installation of the stabilizer bar link 140, the first and second threaded shafts (175, 185) may include a first base portion 177, and a second base portion 187, respectively. The first and second base portions (177, 187) may have a non-rounded perimeter, and the first and second receiving orifices (210, 230) may have a perimeter that may be a complementary shape to the non-rounded perimeter of the first and second base portions (177, 187). In this regard, for example, the first receiving orifice 210 and the first base portion 177 may function as the hold feature and may hold the first threaded shaft 175 in place while the fastener 220 may be tightened thereon. As such, the fastener 220 may be driven with a singular, normal, non-specialized, tool such as a wrench or socket wrench.

Figure 10:
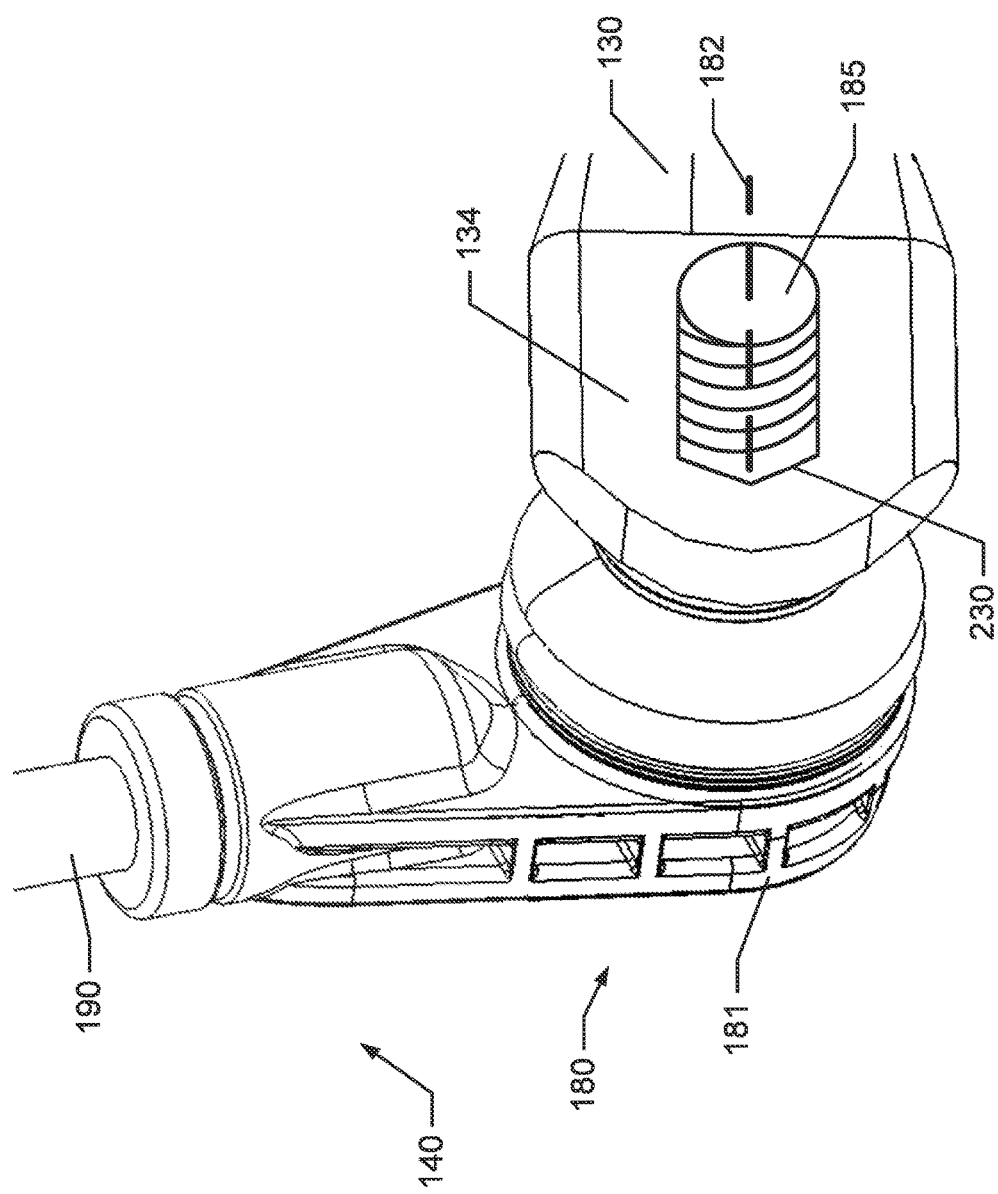
FIG. 10 illustrates a close up perspective view of the lower ball joint operably coupled to the stabilizer bar with the fastener removed in accordance with an example embodiment.

FIG. 10 depicts a perspective view of the second ball joint 180 operably coupled to the stabilizer bar 130. As described above, the second threaded shaft 185 may include a second base portion 187 having a non-rounded perimeter. In this case, the second receiving orifice 230 may be disposed in the end of the stabilizer bar 130 where the stabilizer bar 130 has been pressed flat. The second receiving orifice 230 may also have a perimeter that may be a complementary shape to the non-rounded perimeter of the second base portion 187. In this regard, the second receiving orifice 230 and the second base portion 187 may function as the hold feature and may hold the second threaded shaft 185 in place while the fastener 220 may be tightened thereon. As such, the fastener 220 may be driven with a singular, normal, non-specialized, tool such as a wrench or socket wrench.

In some example embodiments, the first ball joint 170 may be a component of a first ball joint assembly (or an upper ball joint assembly) which may further include the first receiving orifice 210, the first ball joint 170, and the fastener 220. Similarly, the second ball joint 180 may be a component of a second ball joint assembly (or a lower ball joint assembly) which may include the second receiving orifice 230, the second ball joint 180, and the fastener 220. In some cases, only the first receiving orifice 210 and the first base portion 177 may include the non-rounded perimeter. In an example embodiment, only the second receiving orifice 230 and the second base portion 187 may include the non-rounded perimeter. In some cases, both the first and the second receiving orifices (210, 230) and the first and second base portions (177, 187) may include the non-rounded perimeter.

Figure 6:
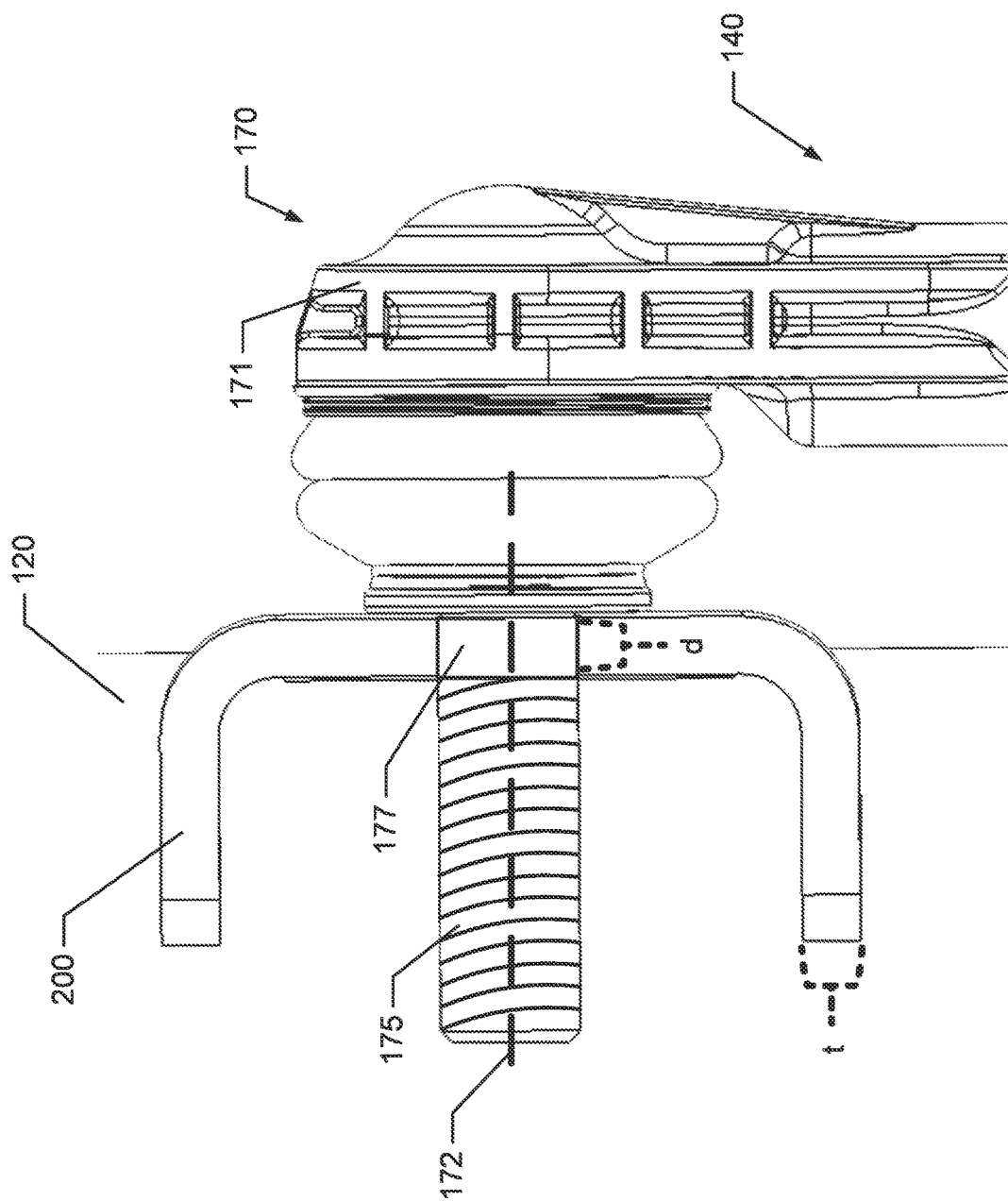
FIG. 6 illustrates a side view of the upper ball joint and the stabilizer bar link bracket with the fastener removed in accordance with an example embodiment.
Figure 7:
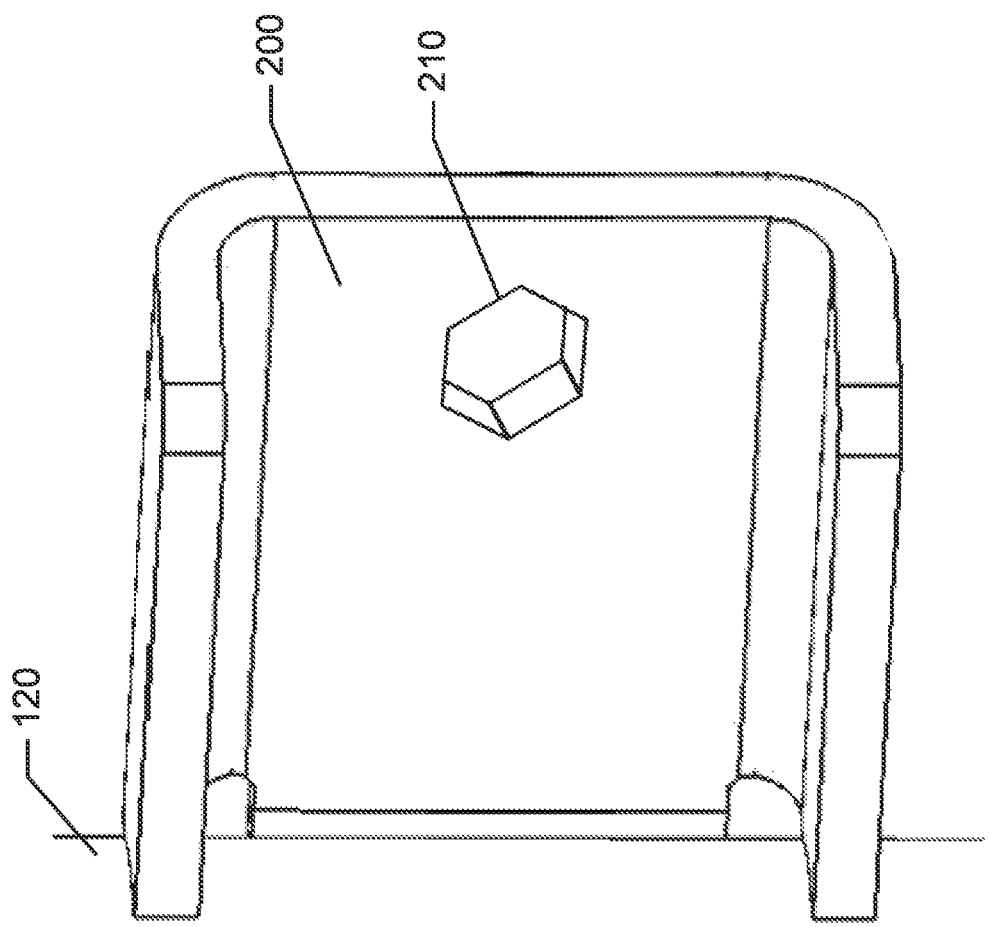
FIG. 7 illustrates a close up perspective view of the stabilizer bar link bracket with the upper ball joint removed in accordance with an example embodiment.
Figure 9:
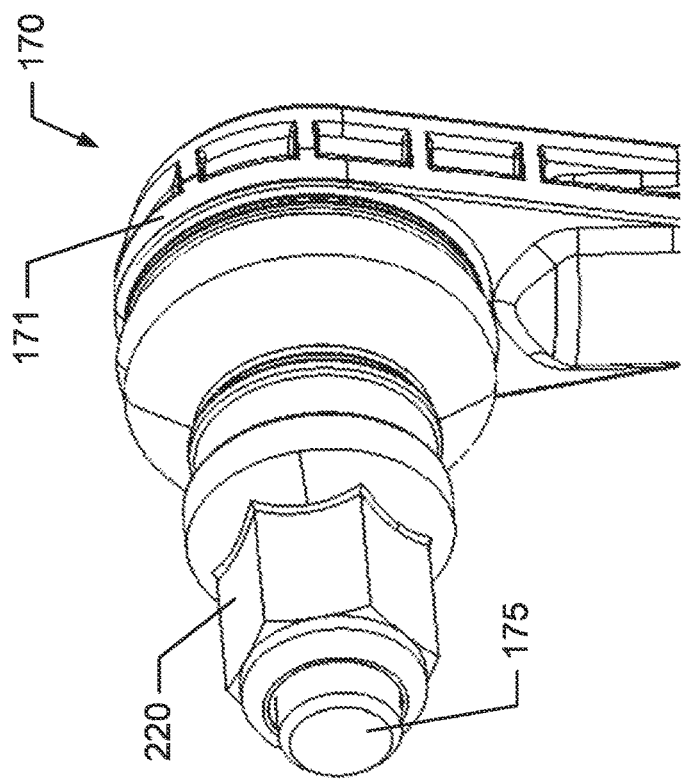
FIG. 9 illustrates a close up perspective view of the upper ball joint with the stabilizer bar link bracket removed in accordance with an example embodiment.
Figure 8:
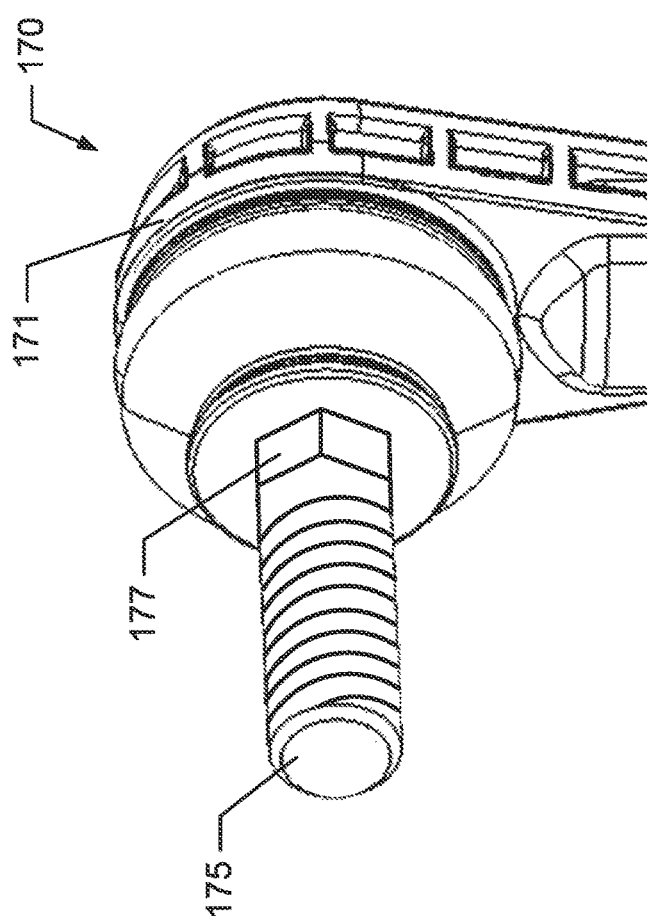
FIG. 8 illustrates a close up perspective view of the upper ball joint with the stabilizer bar link bracket and fastener removed in accordance with an example embodiment.

In some cases, as shown in FIG. 6, a length (d) of the first and second base portions (177, 187) of the first and second threaded shafts (175, 185) that may include the non-rounded shaped perimeter may be less than a thickness (t) of the stabilizer bar link bracket 200, and of the flattened end 134 of the stabilizer bar 130, respectively. In this regard, since the threads of the first and second threaded shafts (175, 185) may extend to where the first and second base portions (177, 187) begin, the fastener 220 may be tightened until the end of the threads where it may be in contact with the stabilizer bar link bracket 200 or with the stabilizer bar 130, to operably couple the stabilizer bar link 140 to the strut 120, and to the stabilizer bar 130, respectively, without any play or extra room for movement of the first and second ball joints (170, 180). For a similar reason, in some other cases, the length of the first and second base portions (177, 187) of the first and second threaded shafts (175, 185) that may include the non-rounded shaped perimeter may be equal to a thickness of the stabilizer bar link bracket 200, or of the flattened end 134 of the stabilizer bar 130, respectively.

In an example embodiment, such as the one depicted in the figures, the non-rounded shaped perimeter may be hexagonal. However, in other cases, the non-rounded shaped perimeter may be embodied as any number of shapes. For example, the non-rounded shaped perimeter may be triangular, square, rectangular, pentagonal, octagonal, cross shaped, x shaped, torx shaped, or any other shape capable of resisting rotational forces.

A suspension assembly for a vehicle suspension system of an example embodiment may therefore be provided. The suspension assembly may include a strut which may operably couple a wheel of the vehicle to a body of the vehicle, a stabilizer bar which may be operably coupled to the strut to reduce body roll, and a stabilizer bar link which may operably couple the stabilizer bar to the strut. The stabilizer bar link may include a first ball joint which may operably couple the stabilizer bar link to the strut, a second ball joint which may operably couple the stabilizer bar link to the stabilizer bar, and a shaft which may extend from the first ball joint to the second ball joint. The strut may include a stabilizer bar link bracket and a first receiving orifice may be formed in the stabilizer bar link bracket to operably couple to the first ball joint. A second receiving orifice may be formed at an end of the stabilizer bar to operably couple to the second ball joint. The first and second ball joints may include first and second threaded shafts, respectively, that may extend through respective ones of the first and second receiving orifices and operably couple to a fastener on an opposite side of the respective ones of the first and second receiving orifices. A base of one of the first and second threaded shafts may include a non-rounded shaped perimeter. A perimeter of one of the first and second receiving orifices may be complementary to the non-rounded shaped perimeter of the base of one of the first and second threaded shafts to hold one of the first and second threaded shafts in place while the fastener may be tightened thereon.

The suspension assembly of some embodiments may include additional features, modifications, augmentations and/or the like to achieve further objectives or enhance performance of the suspension assembly. The additional features, modifications, augmentations and/or the like may be added in any combination with each other. Below is a list of various additional features, modifications, and augmentations that can each be added individually or in any combination with each other. For example, the base of the first threaded shaft may include the non-rounded shaped perimeter and the perimeter of the first receiving orifice may be complementary to the non-rounded shaped perimeter of the base of the first threaded shaft. In an example embodiment, a length of the base of the first threaded shaft which may include the non-rounded shaped perimeter may be less than a thickness of the stabilizer bar link bracket. In some cases, a length of the base of the first threaded shaft which may include the non-rounded shaped perimeter may be equal to a thickness of the stabilizer bar link bracket. In an example embodiment, the base of the second threaded shaft may include the non-rounded shaped perimeter and the perimeter of the second receiving orifice may be complementary to the non-rounded shaped perimeter of the base of the second threaded shaft. In some cases, a length of the base of the second threaded shaft which may include the non-rounded shaped perimeter may be less than a thickness of the end of the stabilizer bar. In an example embodiment, a length of the base of the second threaded shaft which may include the non-rounded shaped perimeter may be equal to a thickness of the end of the stabilizer bar. In some cases, the base of the first and second threaded shafts may include the non-rounded shaped perimeter and the perimeter of the first and second receiving orifices may be complementary to the non-rounded shaped perimeter of the base of the first and second threaded shafts, respectively. In an example embodiment, a length of the base of the first and second threaded shafts which may include the non-rounded shaped perimeter may be less than a thickness of the stabilizer bar link bracket and the end of the stabilizer bar, respectively. In some cases, a length of the base of the first and second threaded shafts which may include the non-rounded shaped perimeter may be equal to a thickness of the stabilizer bar link bracket and the end of the stabilizer bar, respectively. In an example embodiment, the non-rounded shaped perimeter may be hexagonal. In some cases, the non-rounded shaped perimeter may be triangular, square, rectangular, pentagonal, octagonal, cross shaped, x shaped, or torx shaped.

An upper ball joint assembly for a suspension system for a vehicle may therefore be provided. The upper ball joint assembly may include a receiving orifice operably coupled to a strut, a ball joint which may include a threaded shaft to extend through the receiving orifice, and a fastener to operably couple the threaded shaft to the receiving orifice. A base of the threaded shaft may include a non-rounded shaped perimeter. A perimeter of the receiving orifice may be complementary to the non-rounded shaped perimeter of the base of the threaded shaft to hold the threaded shaft in place while the fastener may be tightened thereon.

A lower ball joint assembly for a suspension system for a vehicle may therefore be provided. The lower ball joint assembly may include a receiving orifice operably coupled to a stabilizer bar, a ball joint which may include a threaded shaft to extend through the receiving orifice, and a fastener to operably couple the threaded shaft to the receiving orifice. The lower ball joint assembly may operably couple a stabilizer bar link to the stabilizer bar at a flattened end of the stabilizer bar. A base of the threaded shaft may include a non-rounded shaped perimeter. A perimeter of the receiving orifice may be complementary to the non-rounded shaped perimeter of the base of the threaded shaft to hold the threaded shaft in place while the fastener may be tightened thereon.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A suspension assembly for a vehicle suspension system, the assembly comprising:
   a strut to operably couple a wheel of the vehicle to a body of the vehicle;
   a stabilizer bar operably coupled to the strut to reduce body roll; and
   a stabilizer bar link to operably couple the stabilizer bar to the strut,
   wherein the stabilizer bar link comprises:
   a first ball joint to operably couple the stabilizer bar link to the strut;
   a second ball joint to operably couple the stabilizer bar link to the stabilizer bar; and
   a shaft extending from the first ball joint to the second ball joint,
   wherein the strut comprises a stabilizer bar link bracket and a first receiving orifice is formed in the stabilizer bar link bracket to operably couple to the first ball joint,
   wherein a second receiving orifice is formed at an end of the stabilizer bar to operably couple to the second ball joint,
   wherein the first and second ball joints comprise first and second threaded shafts, respectively, that extend through respective ones of the first and second receiving orifices and operably couple to a fastener on an opposite side of the respective ones of the first and second receiving orifices,
   wherein a base of one of the first and second threaded shafts comprises a non-rounded shaped perimeter, and
   wherein the non-rounded shaped perimeter of the base of one of the first and second threaded shafts is inserted into a perimeter of one of the first and second receiving orifices to hold one of the first and second threaded shafts in place while the fastener is tightened thereon.

2. The suspension assembly of claim 1, wherein the base of the first threaded shaft comprises the non-rounded shaped perimeter and the perimeter of the first receiving orifice has a same shape as the non-rounded shaped perimeter of the base of the first threaded shaft.

3. The suspension assembly of claim 2, wherein a length of the base of the first threaded shaft comprising the non-rounded shaped perimeter is less than a thickness of the stabilizer bar link bracket.

4. The suspension assembly of claim 2, wherein a length of the base of the first threaded shaft comprising the non-rounded shaped perimeter is equal to a thickness of the stabilizer bar link bracket.

5. The suspension assembly of claim 1, wherein the base of the second threaded shaft comprises the non-rounded shaped perimeter and the perimeter of the second receiving orifice has a same shape as the non-rounded shaped perimeter of the base of the second threaded shaft.

6. The suspension assembly of claim 5, wherein a length of the base of the second threaded shaft comprising the non-rounded shaped perimeter is less than a thickness of the end of the stabilizer bar.

7. The suspension assembly of claim 5, wherein a length of the base of the second threaded shaft comprising the non-rounded shaped perimeter is equal to a thickness of the end of the stabilizer bar.

8. The suspension assembly of claim 1, wherein the base of the first and second threaded shafts comprises the non-rounded shaped perimeter and the perimeter of the first and second receiving orifices have a same shape as the non-rounded shaped perimeter of the base of the first and second threaded shafts, respectively.

9. The suspension assembly of claim 8, wherein a length of the base of the first and second threaded shafts comprising the non-rounded shaped perimeter is less than or equal to a thickness of the stabilizer bar link bracket and the end of the stabilizer bar, respectively.

10. The suspension assembly of claim 1, wherein the non-rounded shaped perimeter is hexagonal.

11. The suspension assembly of claim 1, wherein the non-rounded shaped perimeter is triangular, square, rectangular, pentagonal, octagonal, cross shaped, x shaped, or torx shaped.

12. An upper ball joint assembly for a suspension system for a vehicle, the upper ball joint assembly comprising:
a receiving orifice operably coupled to a strut;
a ball joint having a threaded shaft to extend through the receiving orifice; and
a fastener to operably couple the threaded shaft to the receiving orifice,
wherein a base of the threaded shaft comprises a non-rounded shaped perimeter, and
wherein the non-rounded shaped perimeter of the base of the threaded shaft is inserted into a perimeter of the receiving orifice to hold the threaded shaft in place while the fastener is tightened thereon.

13. The upper ball joint assembly of claim 12, wherein the strut comprises a stabilizer bar link bracket and the receiving orifice is formed in the stabilizer bar link bracket to operably couple to the upper ball joint assembly.

14. The upper ball joint assembly of claim 13, wherein a length of the base of the threaded shaft comprising the non-rounded shaped perimeter is less than or equal to a thickness of the stabilizer bar link bracket.

15. The upper ball joint assembly of claim 12, wherein the non-rounded shaped perimeter is hexagonal.

16. The upper ball joint assembly of claim 12, wherein the non-rounded shaped perimeter is triangular, square, rectangular, pentagonal, octagonal, cross shaped, x shaped, or torx shaped.

17. A lower ball joint assembly for a suspension system for a vehicle, the lower ball joint assembly comprising:
a receiving orifice operably coupled to a stabilizer bar;
a ball joint having a threaded shaft to extend through the receiving orifice; and
a fastener to operably couple the threaded shaft to the receiving orifice,
wherein the lower ball joint assembly is operably coupled to a stabilizer bar link and to the stabilizer bar at a flattened end of the stabilizer bar,
wherein a base of the threaded shaft comprises a non-rounded shaped perimeter, and
wherein the non-rounded shaped perimeter of the base of the threaded shaft is inserted into a perimeter of the receiving orifice to hold the threaded shaft in place while the fastener is tightened thereon.

18. The lower ball joint assembly of claim 17, wherein a length of the base of the threaded shaft comprising the non-rounded shaped perimeter is less than or equal to a thickness of the flattened end of the stabilizer bar.

19. The lower ball joint assembly of claim 17, wherein the non-rounded shaped perimeter is hexagonal.

20. The lower ball joint assembly of claim 17, wherein the non-rounded shaped perimeter is triangular, square, rectangular, pentagonal, octagonal, cross shaped, x shaped, or torx shaped.

* * * * *